May 15, 1923.

J. T. THOMPSON

OPTICAL INSTRUMENT

Filed July 19, 1920

Inventor
John T. Thompson
By Arthur L. Slee
Atty.

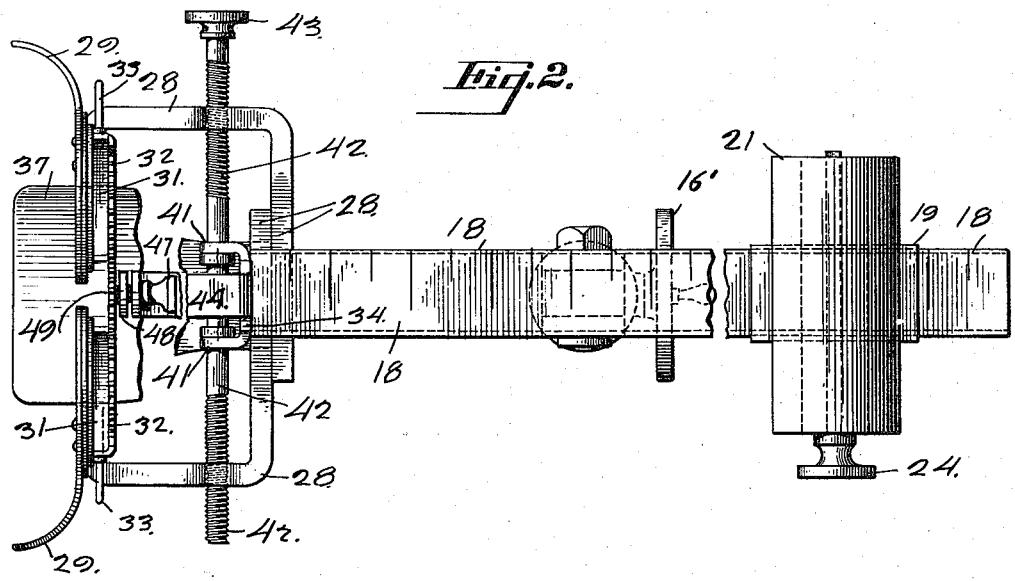
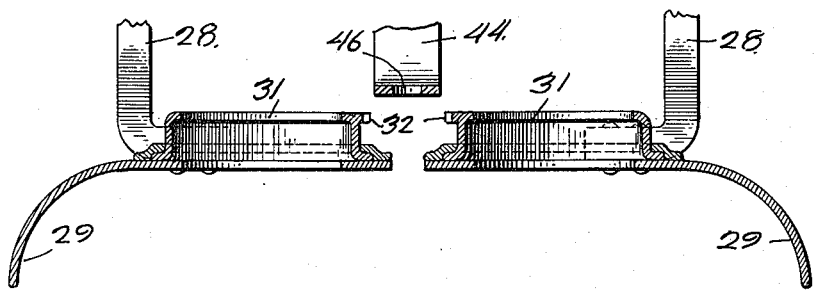

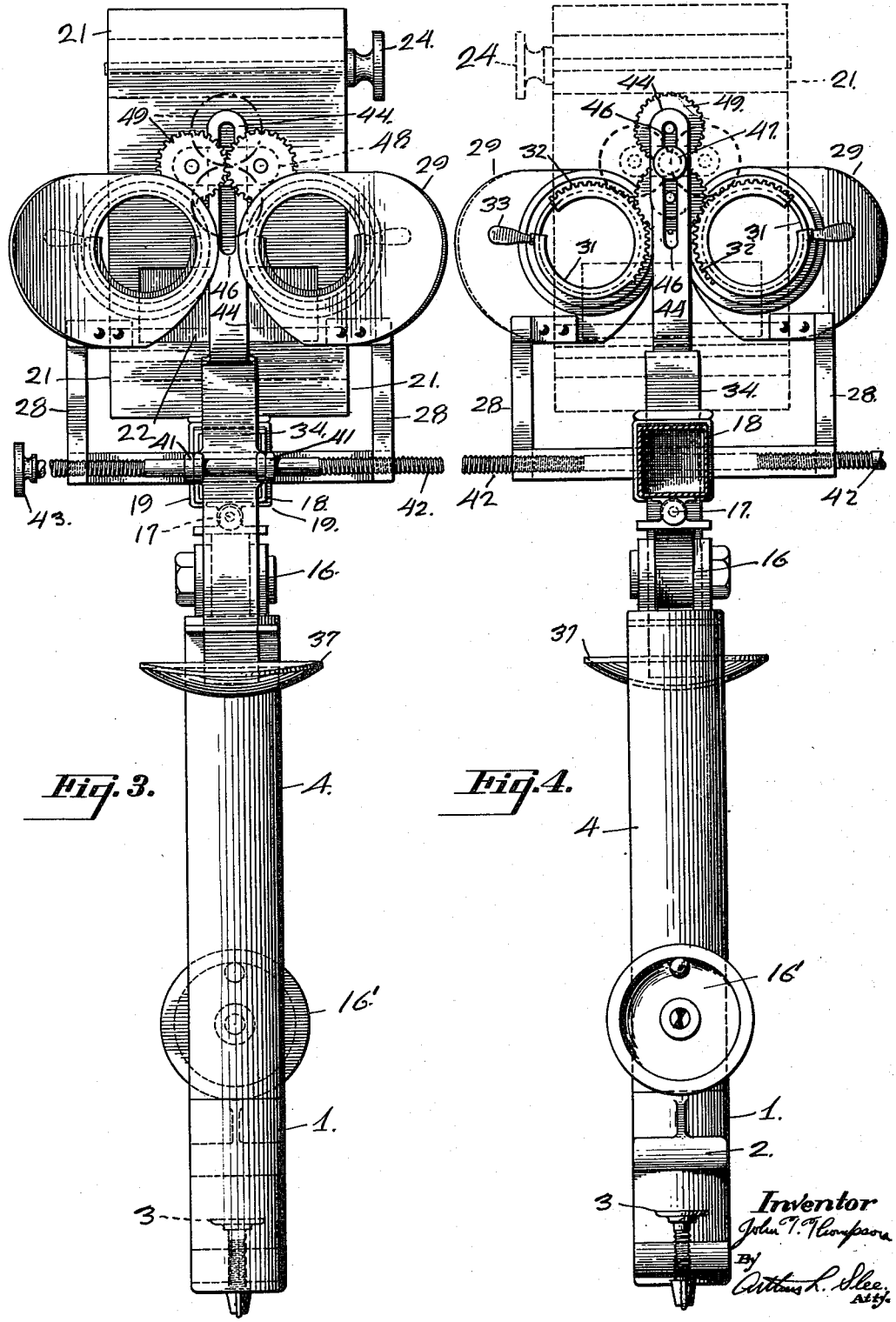

Patented May 15, 1923.

1,455,011

UNITED STATES PATENT OFFICE.

JOHN T. THOMPSON, OF SAN FRANCISCO, CALIFORNIA.

OPTICAL INSTRUMENT.

Application filed July 19, 1920. Serial No. 397,277.

*To all whom it may concern:*

Be it known that I, JOHN T. THOMPSON, a subject of the King of Great Britain, residing in the city and county of San Francisco and State of California, have invented a new and useful Improvement in Optical Instruments, of which the following is a specification.

My invention relates to improvements in optical instruments wherein lens cells are adjustably mounted relatively to a chart or object to measure the degree of convergence of the lines of vision of both eyes and wherein said cells are provided with means for independently rotating said cells, or for rotating said cells in either opposite or the same directions.

The primary object of the present invention is to provide an improved optical instrument of simple and economical construction and having few and simple parts of maximum efficiency.

A further object of the present invention is to provide an improved device of the character described that shall be adapted to be easily and readily adjustable to a pupillary distance.

A still further object of the invention is to provide improved means for the correction of minor degrees of pathological defects of the inner and outer muscles of the eye.

Other objects and advantages will more fully appear.

I accomplish these several objects by means of the improved device disclosed in the drawings forming a part of the present specification wherein like characters of reference are used to designate similar parts throughout the said specifications and drawings, and in which—

Fig. 2 is a broken plan view of Fig. 1;

Fig. 3 is a left hand elevation of Fig. 1;

Fig. 4 is a vertical sectional view taken on line 4—4 of Fig. 1; in the direction indicated; and Fig. 5 is an enlarged, broken horizontal sectional view taken through the movable lens cells.

Figure 1:
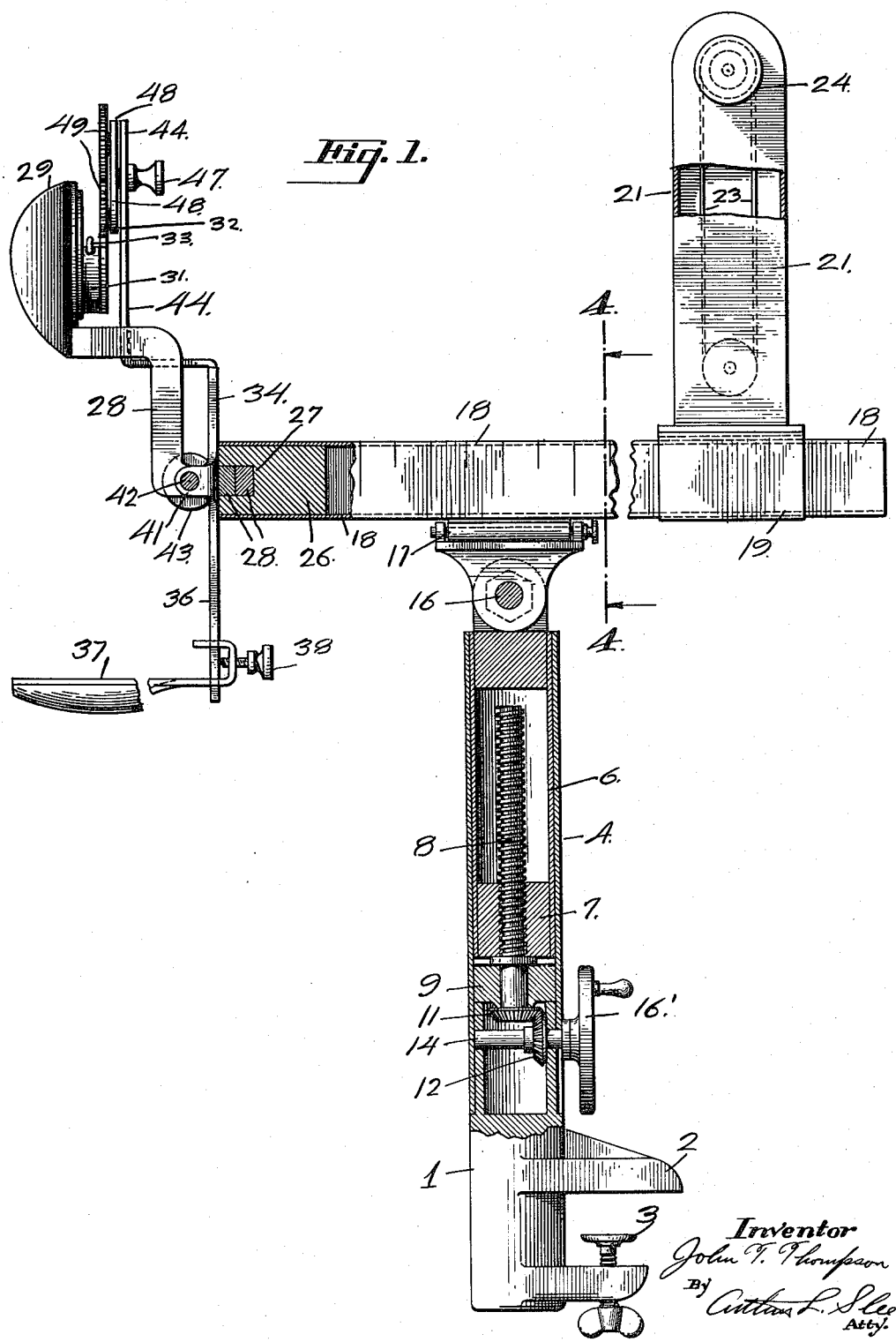
Fig. 1 is a broken side elevation of my improved device, partly in vertical section.

Referring to the drawings the numeral 1 is used to designate a standard having a lateral lug 2 and a clamping member 3 whereby said standard may be detachably secured to a table edge or the like.

The standard 1 is provided with an upwardly extending tubular extension 4 within which is slidably mounted a second tubular member 6 provided at its lower end with a nut 7 in engaging relation with a threaded rod 8 in turn rotatably mounted within a suitable bearing 9 within the standard 1 and provided with a bevel gear 11 meshing with a similar gear 12 on a shaft 14 provided with a rotating means 16' whereby the tubular member 6 may be raised or lowered when said shaft 14 is rotated.

The upper end of the tubular member 6 is provided with hinged joints 16 and 17 arranged at right angles to each other whereby a universal connection is obtained to support a hollow graduated tube 18, preferably, but not necessarily, square or rectangular in cross section.

Slidably mounted upon the tube 18 is a sleeve 19 supporting a suitable housing 21 having a window 22 in one side thereof and an endless chart 23 therein controlled by a knob 24.

The chart 23 has imprinted or otherwise impressed thereon suitable characters and designs, not shown, by means of which the vision of patients requiring optical treatment is tested.

Within the end of the tube 18 opposite the housing 21 I have provided a rigid plug 26 grooved transversely as at 27 within which groove 27 are slidably mounted a pair of arms 28 carrying at their upper or free ends suitable apertured shields 29 having lens cells 31, each provided with a geared sector 32, rotatably mounted thereon.

Each lens cell 31 is provided with a suitable knob or handle, 33.

Secured to the plug 26 is a member 34 having a depending portion 36 upon which is slidably mounted a chin rest 37 provided with a suitable thumb nut 38 to prevent movement of said chin rest 37 upon the depending portion 36 of the member 34.

The member 34 is also provided with a pair of lugs 41 within which is rotatably mounted a rod 42 having oppositely threaded ends passing through the arms 28 and provided with a thumb nut 43 by means of which the rod 42 may be rotated to move the arms 28 in opposite directions whereby the lens cells 31 may be moved toward or away from each other to obtain a required pupillary distance between the centers of said lens cells 31.

The member 34 is also provided with an upwardly extending offset extension 44 having a vertically disposed slot 46 therein within which is slidably mounted a thumb nut 47 carrying a bar 48 having a pinion 49 rotatably mounted upon each end thereof, said pinions being constantly in mesh with each other.

By means of the thumb nut 47 the bar 48 and pinions 49 are rotatably and slidably mounted within the slot 46 of the extension 44 so that either one or both of said pinions 49 may mesh with the geared sectors 32 of the lens cells 31.

In operation the chin of the patient is placed upon the chin rest 37, said chin raised or lowered to the correct position by rotation of the shaft 14.

Through the medium of the joints 16 and 17 the longitudinal and lateral position of the tube 18 is leveled and also adjusted to accommodate the device to the position of the patient.

The sleeve 19 and housing 21 thereon are moved or adjusted to the correct position for testing the vision of the patient and the position indicated by the graduations on the tube 18.

The knob 24 is rotated to bring the required characters on the chart 23 opposite the window 21, it being understood that said characters are of various shapes and designs, which shapes and designs form an important factor in arriving at a correct diagnosis of the case, but this feature being well known in the art does not require detailed description in the present specification.

By adjustment of the housing 21 relatively to the lens cells 31, in conjunction with the character of the designs displayed on the chart 23, factors are indicated by means of the graduations on the tube 18 to determine the degree of convergence of the lines of vision of the patient.

As in the present art suitable refracting lenses are placed within the lens cells 31 and the nature of these lenses as well at their position also provide factors which, taken in conjunction with other factors, also assists in determining the degree of convergence or divergence of the vision of the patent.

While testing both eyes simultaneously the lens cells 31, containing appropriate lenses of the required character, may be rotated independently or together in the same or opposite directions by means of the attachment consisting of the pinions 49 and their supporting bar 48.

When the lens cells 31 are to be rotated independently of each other the thumb nut 47 is loosened and raised to the upper end of the slot 46 and tightened in that position which will prevent engagement of the pinions 49 with the geared sectors 32 of the lens cells 31.

When the cells 31 are to be rotated in the same direction and degree simultaneously the thumb nut 47 is loosened and the bar 48 is positioned to permit engagement of either pinion 49 with both geared sectors 32 of the cells 31 as disclosed in full lines in Fig 4 of the drawings. Rotation of either cell 31, by means of its respective lever or knob 33, will cause the other cell 31 to be rotated in the same direction by means of the idler gear or pinion 49 in mesh with both sectors 32.

When the cells 31 are to be rotated in opposite directions the bar 48 is placed horizontally so as to bring both pinions 49 in mesh with both geared sectors 32 of the cells 31. Then when one cell is rotated in one direction the other cell will be rotated in the opposite direction, the second pinion 49 operating to change the direction of rotation.

Whether operating the cells in the same or opposite directions the pinions 49 may at all times be placed in proper mesh regardless of the distance between the geared sectors 32 of the cells 31 this novel feature being provided by the slot 46 of the extention 44, said pinions being readily lowered or elevated to properly engage the sectors 32 through the medium of said slot.

The pinions 49 are employed to rotate the cells 31 when the patient is being treated for minor degrees of pathological defects.

By rotating prismatic or refracting lenses within the lens cells 31 the objective view by the patient is placed out of focus and he operates, automatically and unconsciously all of the inner and outer muscles of the eye, to return the objective into focus whether the refraction be abnormal or subnormal.

This provides an excellent exercise for said muscles and usually corrects minor defects.

The entire instrument is simple and effective in operation as well as economical in operation. The various parts are readily accessible for operation and possessed of a maximum efficiency.

Having thus described my invention what I claim as new and desire to secure by Letters Patent is—

1. An optical instrument comprising a pair of lens cells; means for adjustably supporting said cells; and means engaging said cells whereby the same may be rotated simultaneously either in the same or opposite directions.

2. An optical instrument comprising a pair of lens cells laterally adjustable relatively to each other; adjustable supporting means arranged to receive said cells; and means engaging said cells whereby the same may be rotated simultaneously either in the same or opposite directions.

3. An optical instrument comprising a pair of lens cells; adjustable supporting means arranged to receive said cells; means engaging said cells whereby the same may be rotated simultaneously either in the same or opposite directions and means for adjusting the pupillary distance between the lens cells.

4. An optical instrument comprising a pair of lens cells; means for adjusting the pupillary distance between the cells; adjustable supporting means arranged to receive said cells; adjustable means for engaging and supporting the chin of a patient to register his eyes with the lens cells; and means for rotating the cells simultaneously in either the same or opposite directions.

5. An optical instrument comprising a pair of lens cells having geared sectors thereon; means for adjusting the pupillary distance of the cells; adjustable supporting means arranged to receive said cells; and a pair of pinions in mesh and slidably mounted to engage either or both pinions with the geared sectors of the cells whereby said cells may be rotated in the same or opposite directions respectively.

In witness whereof I hereunto set my signature.

JOHN T. THOMPSON.